United States Patent [19]
Hill

[11] 4,078,437
[45] Mar. 14, 1978

[54] SICKLE DRIVE
[75] Inventor: Amos Grover Hill, Newton, Kans.
[73] Assignee: Hesston Corporation, Hesston, Kans.
[21] Appl. No.: 642,675
[22] Filed: Dec. 19, 1975
[51] Int. Cl.² .......................................... F16H 21/16
[52] U.S. Cl. ........................................ 74/25; 56/296
[58] Field of Search ...................... 56/296, 297, 298; 74/40, 25, 42

[56] References Cited
U.S. PATENT DOCUMENTS

| 937,123 | 10/1909 | Watkins | 74/40 |
| 2,002,396 | 5/1935 | Hite | 56/17.6 |
| 2,691,863 | 10/1954 | Krause | 56/296 |

FOREIGN PATENT DOCUMENTS

| 1,345,238 | 10/1963 | France | 56/296 |
| 513,425 | 2/1955 | Italy | 56/296 |

Primary Examiner—Benjamin W. Wyche
Assistant Examiner—Wesley S. Ratliff, Jr.
Attorney, Agent, or Firm—Schmidt, Johnson, Hovey & Williams

[57] ABSTRACT

A motion transmitting device is capable of transferring motion between a reciprocable element in one plane and a rotatable crank in a parallel, second plane. A connector extending axially from the crank and coupled with the reciprocable element is pivotally restrained at its midpoint against substantial translational movement parallel to the path of travel of the reciprocable element, thereby causing the connector to drive the reciprocable member in response to the rotation of the crank, or vice versa.

10 Claims, 6 Drawing Figures

U.S. Patent    March 14, 1978    4,078,437
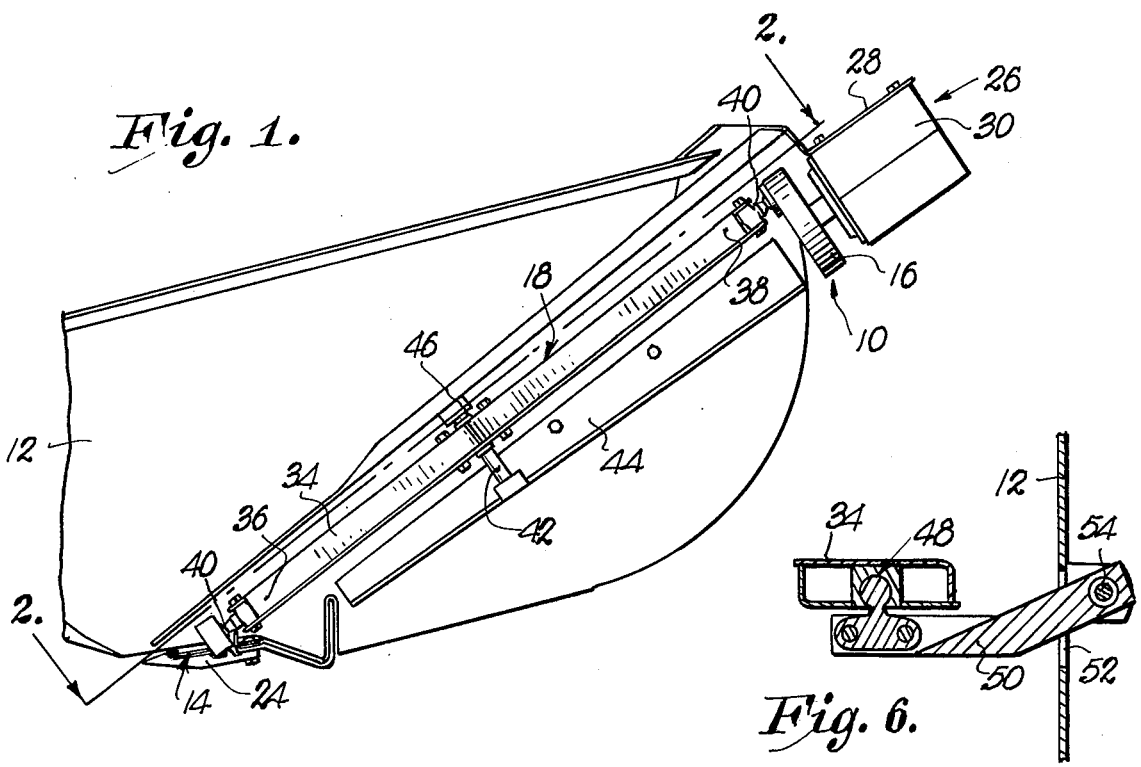
Fig. 1.
Fig. 6.
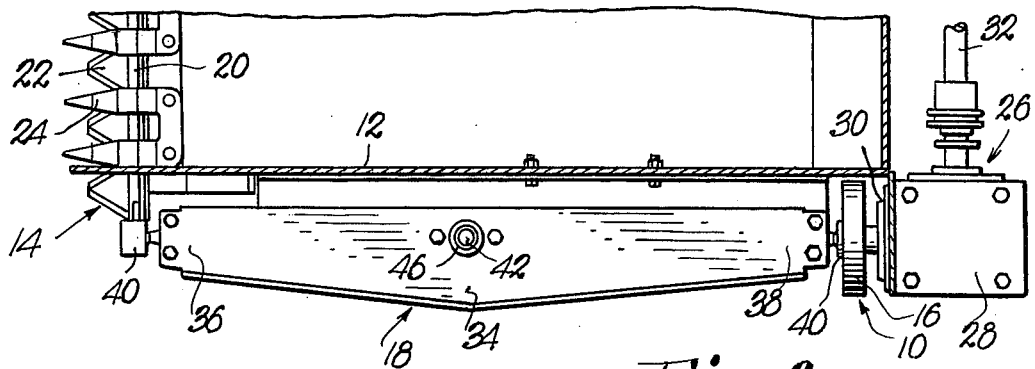
Fig. 2.
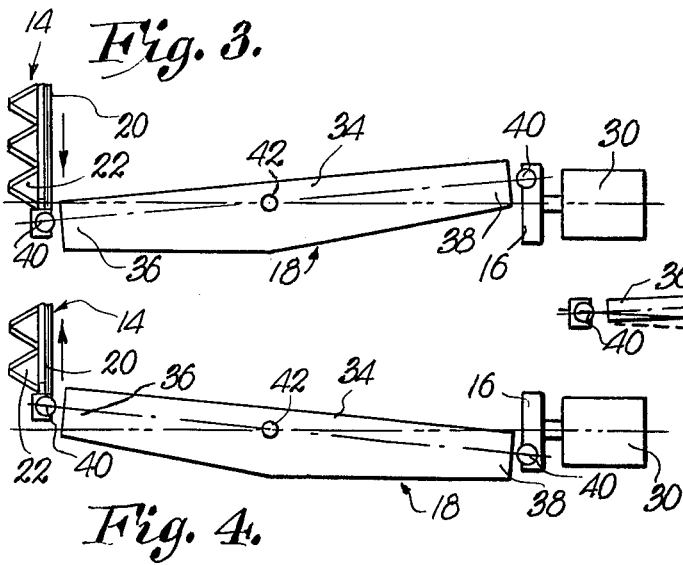
Fig. 3.
Fig. 4.
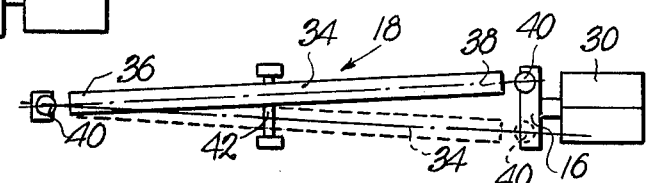
Fig. 5.

SICKLE DRIVE

This invention relates to motion transmitting mechanisms and specifically concerns a device for converting rotational movement to reciprocal movement.

Mechanisms for rotary-to-rectilinear motion conversion are known in the art and include, for example, the power linkage of steam locomotives. Most of these devices are well-suited for transmitting of motion in a single plane; however, it is oftentimes necessary to transmit rotary motion in one plane to rectilinear motion in a second plane. A specific situation where it is desirable to transmit motion between two different planes is found in agricultural implements such as harvesters and the like wherein a reciprocating sickle is carried in close proximity to the ground while the power means is preferably spaced from the reciprocating sickle adjacent the power train of the agricultural vehicle.

A device for converting rotary motion in one plane to reciprocal motion in a second plane is disclosed in U.S. Pat. No. 3,546,864, issued Dec. 15, 1970, and entitled "Vibration-Free Drive for Reciprocable Devices". That patent discloses a drive for an agricultural implement having a powered rotating crank interconnected to the reciprocable sickle by a two-bar linkage wherein one of the links extends substantially parallel to the reciprocable sickle.

One problem with prior art devices capable of transmitting rotational motion in one plane to reciprocal motion in a second plane is that they typically include members which oppositely reciprocate in spaced planes. The oppositely reciprocating members impart a moment to the carrying machine causing excessive vibration and additional stress on the machine components. Another problem with prior art devices is that they involve relatively complicated mechanisms adding to the bulk and weight of the machines in which they are utilized as well as increasing maintenance requirements.

Accordingly, it is an important object of the present invention to provide a simply constructed device for converting rotational motion in one plane to reciprocal motion in a second plane without creating a moment in the carrying structure.

In accordance with the foregoing, it is a further important object of my invention to provide a device as described which employs a single connector link extending axially from a rotatable crank and interconnecting the latter with a reciprocable element in a second plane, wherein the connector link is centrally restrained in such a manner as to cause one end of the connector to reciprocate with the element when the opposite end rotates with the crank and vice versa.

In the drawing:

FIG. 1 is a side elevational view of a device constructed in accordance with the present invention and shown installed upon the header of an agricultural implement;

FIG. 2 is a fragmentary cross-sectional view taken substantially along line 2—2 of FIG. 1;

FIG. 3 is a fragmentary top plan view showing the device in schematic with the reciprocable element approaching one end of its path of travel;

FIG. 4 is a view of the device similar to FIG. 3 but with the reciprocable element approaching the opposite end of its path of travel;

FIG. 5 is a side elevational view of the device shown in schematic and illustrating the sliding movement of the connector along the retaining shaft; and FIG. 6 is an enlarged, vertical cross-sectional view through the sway bar at its point of connection to the header illustrating a second form of making such connection.

For ease of understanding, FIGS. 1–5 have been prepared in such a way as to illustrate the present invention in its most basic respects, although in practice it may be necessary to embody the invention in a more technically refined mechanism, a portion of which, for example, is illustrated in FIG. 6. A motion transmitting device 10 as shown in FIG. 1 is installed upon the header of an agricultural vehicle. Device 10 is carried by a support 12 and includes a reciprocable element in the nature of a conventional sickle assembly 14, a rotatable crank 16 shiftably carried on support 12, and a linkage assembly 18 extending between crank 16 and assembly 14.

Sickle assembly 14 includes an elongate sickle bar 20 carrying a series of sickles 22 and restrained for reciprocal movement in a rectilinear path of travel relative to support 12 by a plurality of sickle guard assemblies 24. Crank 16 is coupled with a drive assembly 26 such that the plane of rotation of crank 16 is parallel to the path of travel of bar 20. Drive assembly 26 is rigidly connected to support 12 by a bracket 28 and includes a right angle gear transmission 30 powered by a drive shaft 32 which is coupled to a power train (not shown) for driving rotation of crank 16.

Linkage assembly 18 includes an elongate connector 34 (commonly referred to as a "sway bar") which operably interconnects crank 16 and bar 20 by virtue of its opposite ends 36 and 38 being respectively coupled to bar 20 and crank 16 by a pair of ball and socket assemblies 40. The longitudinal axis of connector 34 extends axially from crank 16 and thus traversely of its plane of rotation. A pair of spaced brackets 44 are mounted on support 12 and extend generally parallel to connector 34 on opposite upper and lower sides of the latter.

Linkage assembly 18 further includes structure for restraining movement of connector 34 which may include, for example, an elongate shaft 42 rigidly supported at opposite ends by brackets 44 such that its longitudinal axis extends perpendicularly relative to both the path of travel of bar 20 and the axis of rotation of crank 16. Shaft 42 is located at the midpoint of connector 34. A sleeve 46 carried by connector 34 is operably coupled with shaft 42 in coaxial alignment with the latter to permit pivotal movement of connector 34 about the longitudinal axis of shaft 42 as well as sliding movement of connector 34 along the same axis. The pivotal movement between connector 34 and the shaft 42 is best shown in FIGS. 3 and 4, and the sliding movement between these structures is shown in FIG. 5.

In operation, crank 16 is rotated by virtue of its interconnection with drive shaft 32 through gear transmission 30. Rotational movement of crank 16 imparts a motion to connector 34 wherein the latter is simultaneously pivoted at end 36 about a first axis parallel to bar 20 and a second axis perpendicular to bar 20. The pivotal movement of connector 34 about the first axis at end 36 is unrestrained by shaft 42 because of the free motion of sleeve 46 sliding along shaft 42 as is shown in FIG. 5. The pivotal motion about the second axis (perpendicular to bar 20) at end 36 is, on the other hand, restrained by virtue of the interconnection between rigid shaft 42 and sleeve 46 such that connector 34 is caused to pivot about shaft 42, thereby reciprocably moving bar 20 as shown in FIGS. 3 and 4 as the crank 16 is rotated through a full revolution. It will be apparent then, that one rotation of crank 16 will effect a corresponding reciprocal cycle to bar 20 and consequently accomplish the desired motion transformation.

As seen from the above description, the present invention provides a relatively simple mechanism which is capable of effectively transmitting motion from a rotating member in one plane to a reciprocable member positioned in a second plane. The structure of the present invention accomplishes the desired motion conversion without creating unnecessary vibration or imparting excessive stresses to the carrying structure. The invention herein disclosed is a significant improvement over the prior art devices which involve complicated linkages and associated dynamics problems inherent in all complex mechanisms.

While the above description places the present invention in an agricultural implement, it should be remembered that the invention is of a universal nature and could be utilized in any number of environments. Additionally, it should be noted that while the specification describes the invention as having a driving rotatable crank and a driven reciprocable element, the present invention would function equally as well if the reciprocal element were utilized to drive the rotatable crank.

FIG. 6 illustrates a perhaps more practical way of connecting or mounting the sway bar onto the header 12 in order to avoid stresses which might be encountered by the shaft 42 if that mounting arrangement were utilized. In lieu of the shaft 42 and sleeve 46, the sway bar 34 is provided with a ball and socket joint 48 carried on the outermost end of an arm 50 which projects laterally from header 12. The inner end of arm 50 projects through an opening 52 in the wall of header 12 and is supported by a pivot 54 for vertical swinging movement about a fore-and-aft extending axis.

Joint 48 therefore enables the sway bar 34 to tilt slightly in all directions as may be required during its rapid side-to-side and up-and-down oscillation caused by the crank 16. While the pivot 54 permits limited movement of joint 48 toward and away from header 12 as sway bar 34 moves in an arch about 54, such limited displacement of joint 48 is so minimal that its effect on reciprocation of sickle 14 is inconsequential.

Having thus described the invention, what is claimed as new and desired to be secured by Letters Patent is:

1. A motion transmitting device, including:
   a rotatable crank;
   a reciprocable element having a fixed rectilinear path of travel spaced from and parallel to the plane of rotation of said crank;
   an elongate connector extending axially from the crank between the latter and said element;
   means pivotally coupling one end of said connector with said element and the opposite end of said connector with said crank; and
   means intermediate said ends for restraining the connector against substantial translational movement in the direction of said path of travel,
   said restraining means supporting said connector for pivotal movement about a first axis transverse to said path of travel,
   said restraining means permitting swinging movement of said connector about a second pivotal axis adjacent said one end, said second axis extending substantially parallel to said path of travel.

2. A device as set forth in claim 1, wherein said restraining means includes a support swingable at one end about an axis extending between said plane of rotation of the crank and said path of travel, said first pivotal axis of the connector being at the opposite end of the support.

3. A device as set forth in claim 2, wherein said restraining means further includes a joint between said opposite end of the support and the connector permitting tilting of the connector in a number of directions relative to said support, said joint defining said first pivotal axis of the connector.

4. A device as set forth in claim 3, wherein said joint comprises a ball and socket assembly.

5. A device as set forth in claim 4, wherein said restraining means further includes a sleeve which receives said shaft.

6. A device as set forth in claim 5, wherein said restraining means includes a shaft held against movement in the direction of said path of travel and extending generally perpendicularly relative to said path of travel and the axis of rotation of said crank, said connector being pivotal on and shiftable along said shaft for restraint thereby in the direction of said path of travel.

7. A device as set forth in claim 1, wherein said first axis is fixed against displacement in the direction of said path of travel.

8. A device as set forth in claim 1, wherein said first pivotal axis of the connector is equidistant from its opposite ends.

9. A device as set forth in claim 1, wherein said first pivotal axis of the connector intersects the axis of rotation of the crank.

10. A device as set forth in claim 1, wherein said coupling means comprises a ball and socket assembly at each end of the connector respectively.

* * * * *